(12) United States Patent
Stevenson et al.

(10) Patent No.: US 12,138,966 B2
(45) Date of Patent: Nov. 12, 2024

(54) MAGNETIC DRIVE OVER SYSTEM (DOS) PROVIDING TIRE TREAD THICKNESS/DEPTH MEASUREMENT

(71) Applicant: BRIDGESTONE AMERICAS, INC., Nashville, TN (US)

(72) Inventors: Daniel Stevenson, Chapel Hill, NC (US); Steven Noyce, Durham, NC (US); Maria Luisa Sartorelli, Chapel Hill, NC (US); Jesko Von Windheim, Durham, NC (US); Michael Stangler, Durham, NC (US); Glen Metheny, Raleigh, NC (US); Stephen W. Brooks, Raleigh, NC (US); David Alan Koester, Burlington, NC (US); Aaron Daniel Franklin, Cary, NC (US)

(73) Assignee: Bridgestone Americas, Inc., Nashville, TN (US)

( * ) Notice: Subject to any disclaimer, the term of this patent is extended or adjusted under 35 U.S.C. 154(b) by 340 days.

(21) Appl. No.: 17/601,858

(22) PCT Filed: Oct. 7, 2020

(86) PCT No.: PCT/US2020/054513
§ 371 (c)(1),
(2) Date: Oct. 6, 2021

(87) PCT Pub. No.: WO2021/071899
PCT Pub. Date: Apr. 15, 2021

(65) Prior Publication Data
US 2022/0163316 A1    May 26, 2022

Related U.S. Application Data

(60) Provisional application No. 62/912,299, filed on Oct. 8, 2019.

(51) Int. Cl.
*B60C 11/24* (2006.01)
*G01B 7/06* (2006.01)
(Continued)

(52) U.S. Cl.
CPC ............ *B60C 11/246* (2013.01); *G01B 7/107* (2013.01); *G01B 7/26* (2013.01); *G01M 17/02* (2013.01)

(58) Field of Classification Search
CPC ......... B60C 11/246; G01B 7/107; G01B 7/26; G01B 17/02
See application file for complete search history.

(56) References Cited

U.S. PATENT DOCUMENTS 3,183,481 A * 5/1965 McCrory ................. G01B 5/18
33/561.1
5,962,779 A * 10/1999 Bass ..................... G01L 17/005
73/146.5

(Continued)

FOREIGN PATENT DOCUMENTS

FR          3079568 A1     10/2019

OTHER PUBLICATIONS

International Search Report and Written Opinion of the International Searching Authority for PCT International Application No. PCT/US2020/054513 dated Jan. 11, 2021.
Extended European Search Report for EP Patent Application No. 20874564.6, mailed Sep. 25, 2023, 7 pages.

*Primary Examiner* — Jill E Culler

(57) ABSTRACT

According to some embodiments disclosed herein, a system is provided to measure a tread of a tire. The system includes a nonmagnetic layer providing a drive over surface, a magnet, and a magnetic sensor associated with the magnet. The drive over surface is adapted to receive the tire thereon including the tread to be measured. The magnet has opposing first and second magnetic poles, the nonmagnetic layer
(Continued)

is between the drive over surface and the magnet, and the magnet is arranged so that the first magnetic pole is between the second magnetic pole and the nonmagnetic layer. The nonmagnetic layer is between the drive over surface and the magnetic sensor, and the magnetic sensor is configured to detect a magnetic field resulting from the magnet and the tire on the drive over surface.

20 Claims, 13 Drawing Sheets

(51) Int. Cl.
  *G01B 7/26* (2006.01)
  *G01M 17/02* (2006.01)

(56) References Cited

U.S. PATENT DOCUMENTS

| | | | |
|---|---|---|---|
| 7,578,180 B2 | 8/2009 | Lionetti et al. | |
| 7,762,129 B2 * | 7/2010 | Niklas | B60C 11/246 |
| | | | 73/8 |
| 7,797,995 B2 * | 9/2010 | Schafer | G01B 11/22 |
| | | | 73/146 |
| 8,240,198 B2 * | 8/2012 | Schade | G01B 7/26 |
| | | | 73/146 |
| 10,712,238 B2 | 7/2020 | Ledoux et al. | |
| 10,876,826 B2 | 12/2020 | Ledoux et al. | |
| 2010/0139383 A1 | 6/2010 | Haswell et al. | |
| 2016/0153763 A1 | 6/2016 | Ledoux et al. | |
| 2016/0161243 A1 | 6/2016 | Ledoux et al. | |
| 2017/0350781 A1 * | 12/2017 | Ledoux | G01L 17/005 |
| 2021/0372761 A1 | 12/2021 | Leroy | |

* cited by examiner

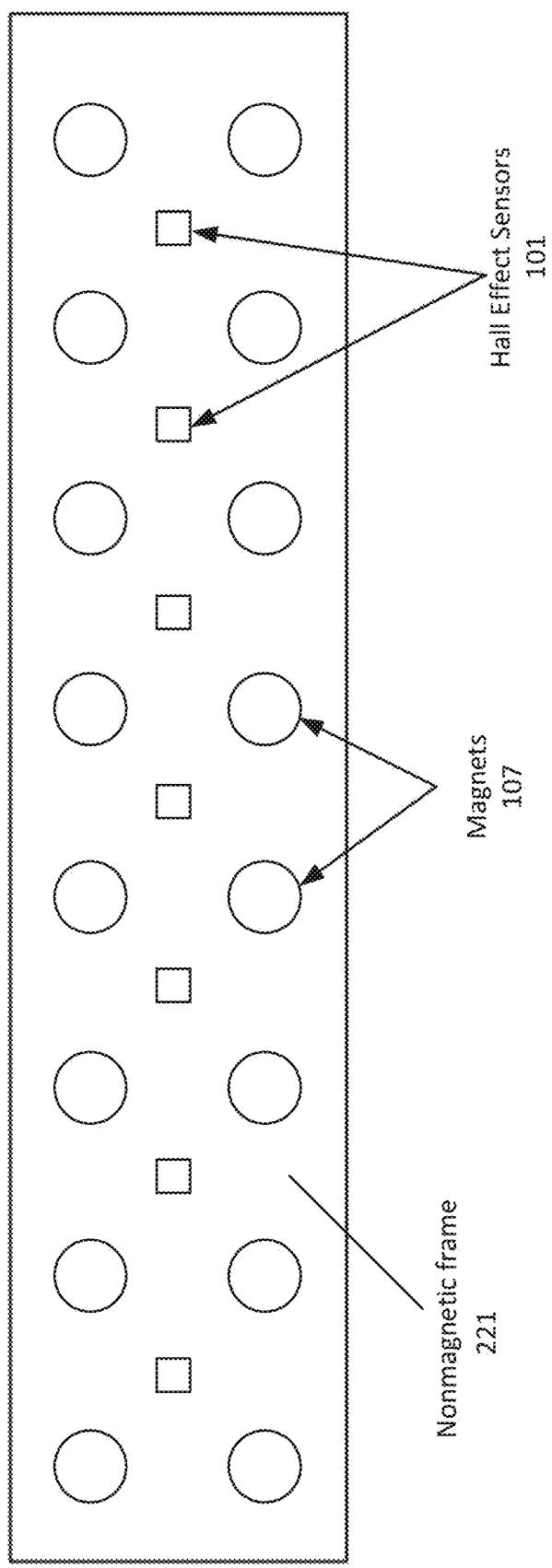

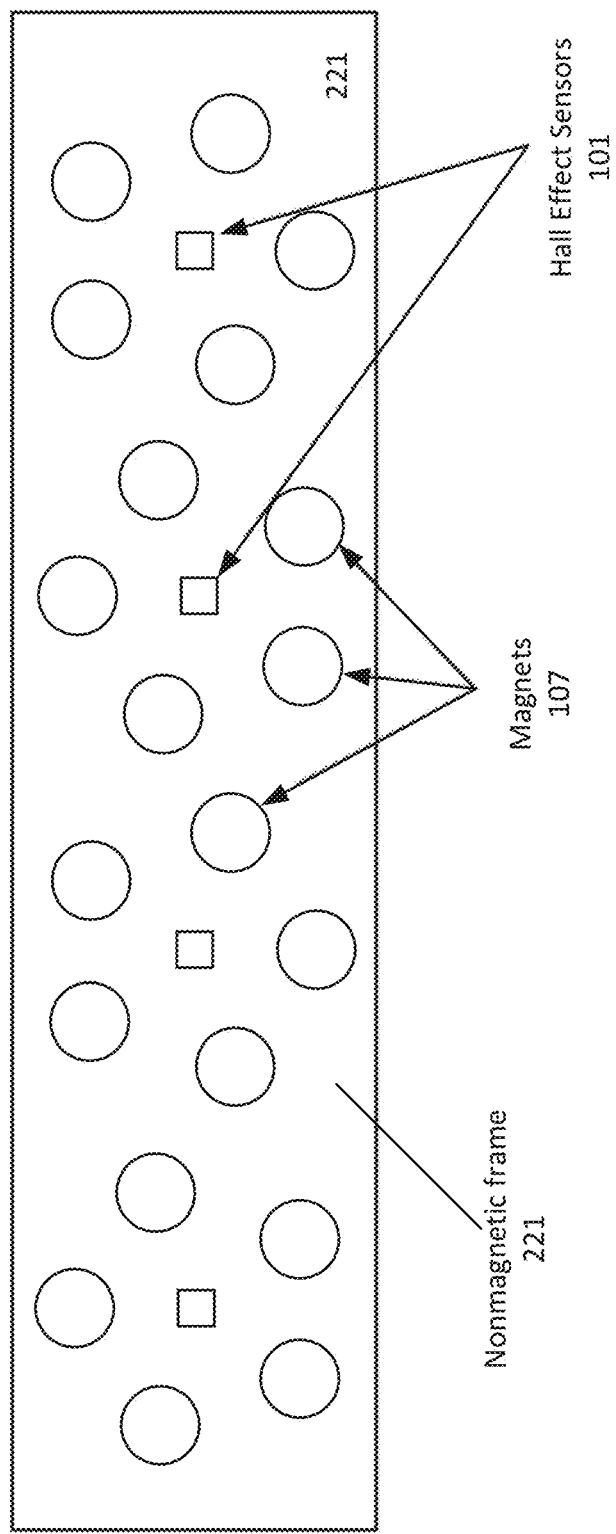

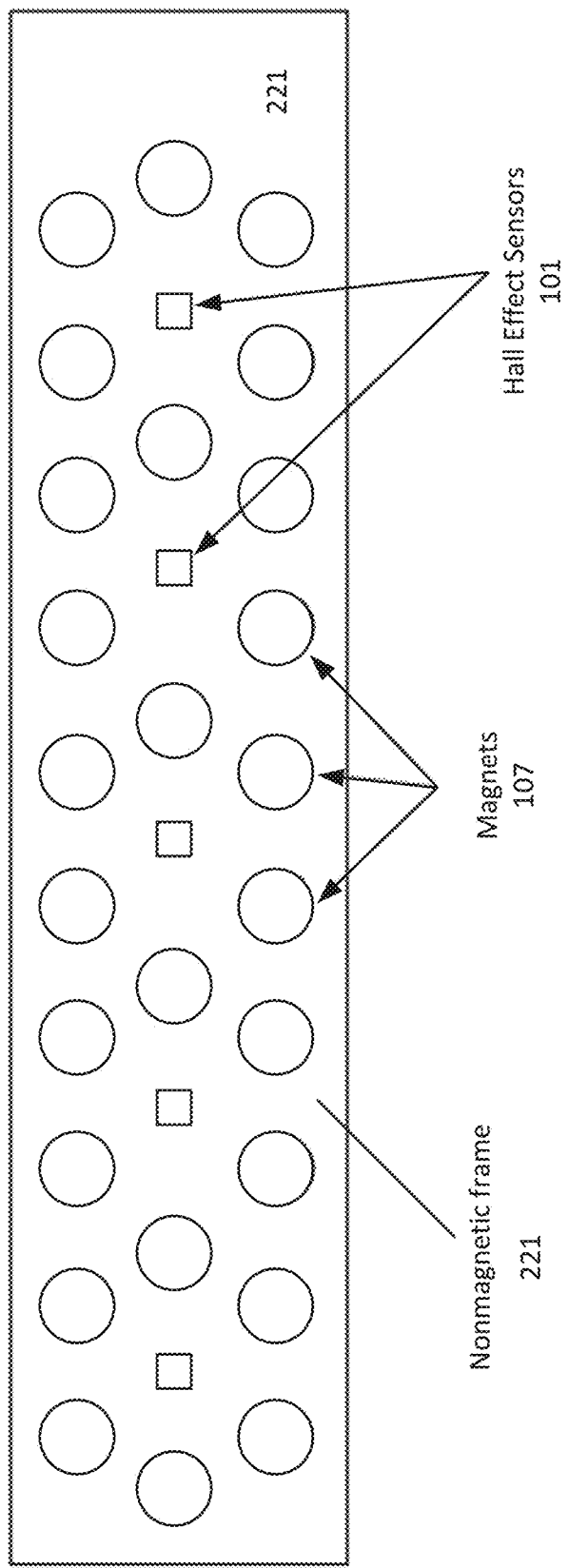

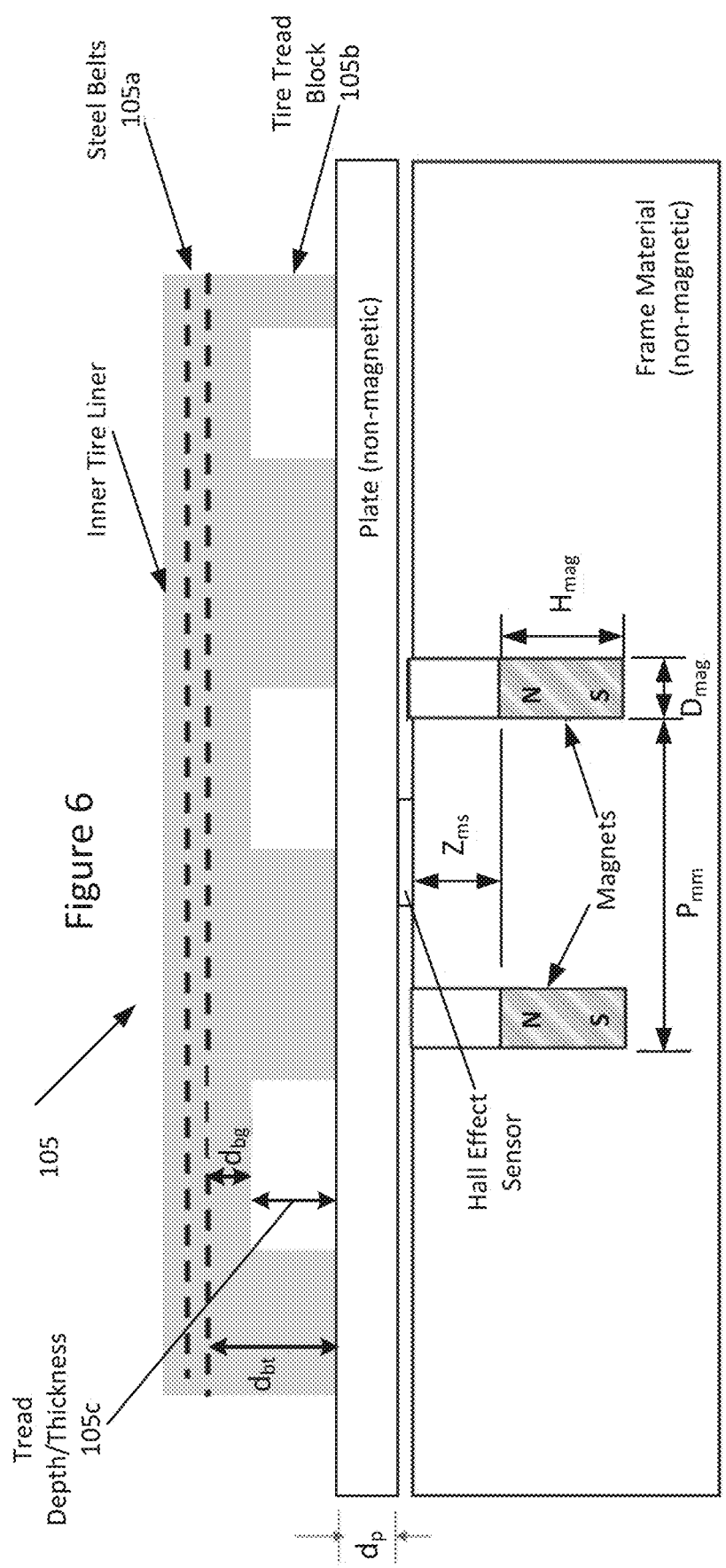

MAGNETIC DRIVE OVER SYSTEM (DOS) PROVIDING TIRE TREAD THICKNESS/DEPTH MEASUREMENT

CROSS REFERENCE TO RELATED APPLICATION

This application is a 35 U.S.C. § 371 national stage application of PCT International Application No. PCT/US2020/054513 filed on Oct. 7, 2020, which in turns claims the benefit of priority from U.S. Provisional Application No. 62/912,299, filed on Oct. 8, 2019, the disclosures and content of which are incorporated by reference herein in their entirety.

TECHNICAL FIELD

The present disclosure relates generally to tires, and more particularly, to systems for measuring tire treads.

BACKGROUND

Currently, tire pressure sensors may be provided in vehicle tires. Such sensors may be used to automatically monitor tire pressure, and a warning (e.g., a warning light) may be provided to the driver when low pressure is detected. Other aspects of the tire, however, may require manual monitoring and failure to adequately monitor such aspects may cause issues relating to safety. Accordingly, improved monitoring of vehicle tires may be desired.

SUMMARY

According to some embodiments of inventive concepts, a system is provided to measure a tread of a tire. The system includes a nonmagnetic layer providing a drive over surface, a magnet, and a magnetic sensor associated with the magnet. The drive over surface is adapted to receive the tire thereon including the tread to be measured. The magnet has opposing first and second magnetic poles, the nonmagnetic layer is between the drive over surface and the magnet, and the magnet is arranged so that the first magnetic pole is between the second magnetic pole and the nonmagnetic layer. The nonmagnetic layer is between the drive over surface and the magnetic sensor, and the magnetic sensor is configured to detect a magnetic field resulting from the magnet and the tire on the drive over surface.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 3 is a top down view illustrating a linear sensor array with magnets mounted in a square configuration around the sensors according to some embodiments of inventive concepts;

FIG. 4 is a top down view illustrating a linear sensor array with magnets mounted in a pentagonal configuration around the sensors according to some embodiments of inventive concepts;

FIG. 5A is a top down view illustrating a linear sensor array with magnets mounted in a hexagonal configuration around the sensors according to some embodiments of inventive concepts;

FIG. 6 is a cross sectional view illustrating dimensions of a sensor system according to some embodiments of inventive concepts;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

The Hall Effect has been used for decades to characterize the electrical properties of materials, particularly in semiconductors. The Hall Effect is discussed by E. H. Hall in "On a New Action of the Magnet on Electrical Current," Amer. J. Math. 2, 287-292 (1879). Characterization of properties of materials using the Hall Effect is discussed in "Test Methods for Measuring Resistivity and Hall Coefficient and Determining Hall Mobility in Single-Crystal Semiconductors," ASTM Designation F76, Annual Book of ASTM Standards, Vol. 10.04 (2011).

Instrumentation to make Hall Effect measurements has been in existence for years. More recently, basic Hall Effect sensing circuits have evolved at the chip level for use as magnetic field sensors. These low-cost chips are typically capable of measuring in the milli-Tesla range and may be easily integrated into standard Printed Circuit Board PCB designs.

Some embodiments of inventive concepts described herein may provide a magnetic sensor system used to determine the thickness of rubber on a tire outside of the steel belts. This thickness may include both the tread rubber and the thin layer(s) of rubber between the bottom of the grooves and the steel belts, and this thickness may be used to determine a tread depth (also referred to as a tread thickness).

The system may be enclosed in a housing that protects the electronics, sensors and magnets, and the housing may provide a structure for vehicles to drive over, allowing the sensors to measure the response of the tires to the induced magnetic fields generated by the magnets in the housing.

Figure 1:
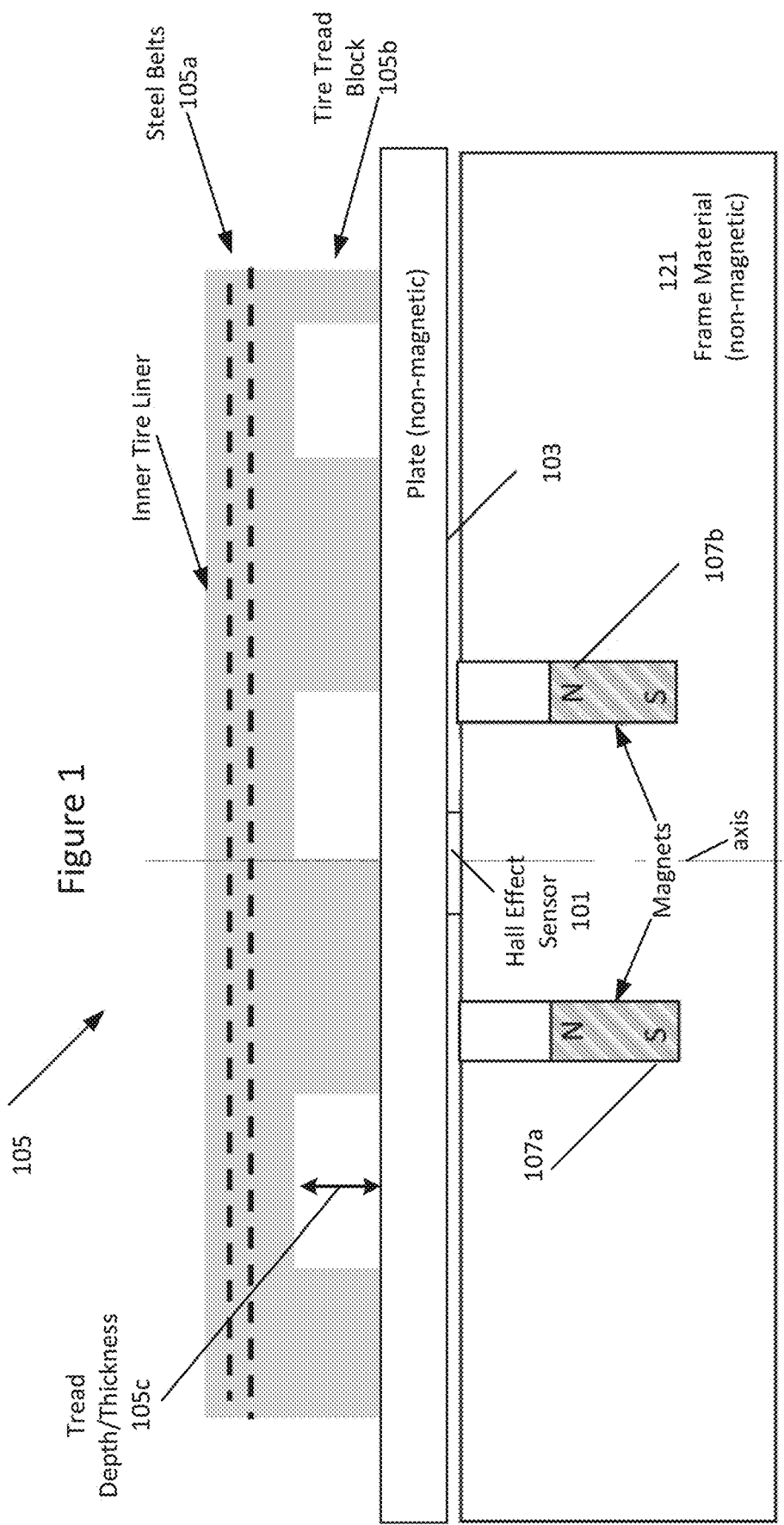
FIG. 1 is a cross sectional view illustrating a single sensor system with magnets mounted vertically and with a sensor positioned along an axis between magnets according to some embodiments of inventive concepts.
Figure 2:
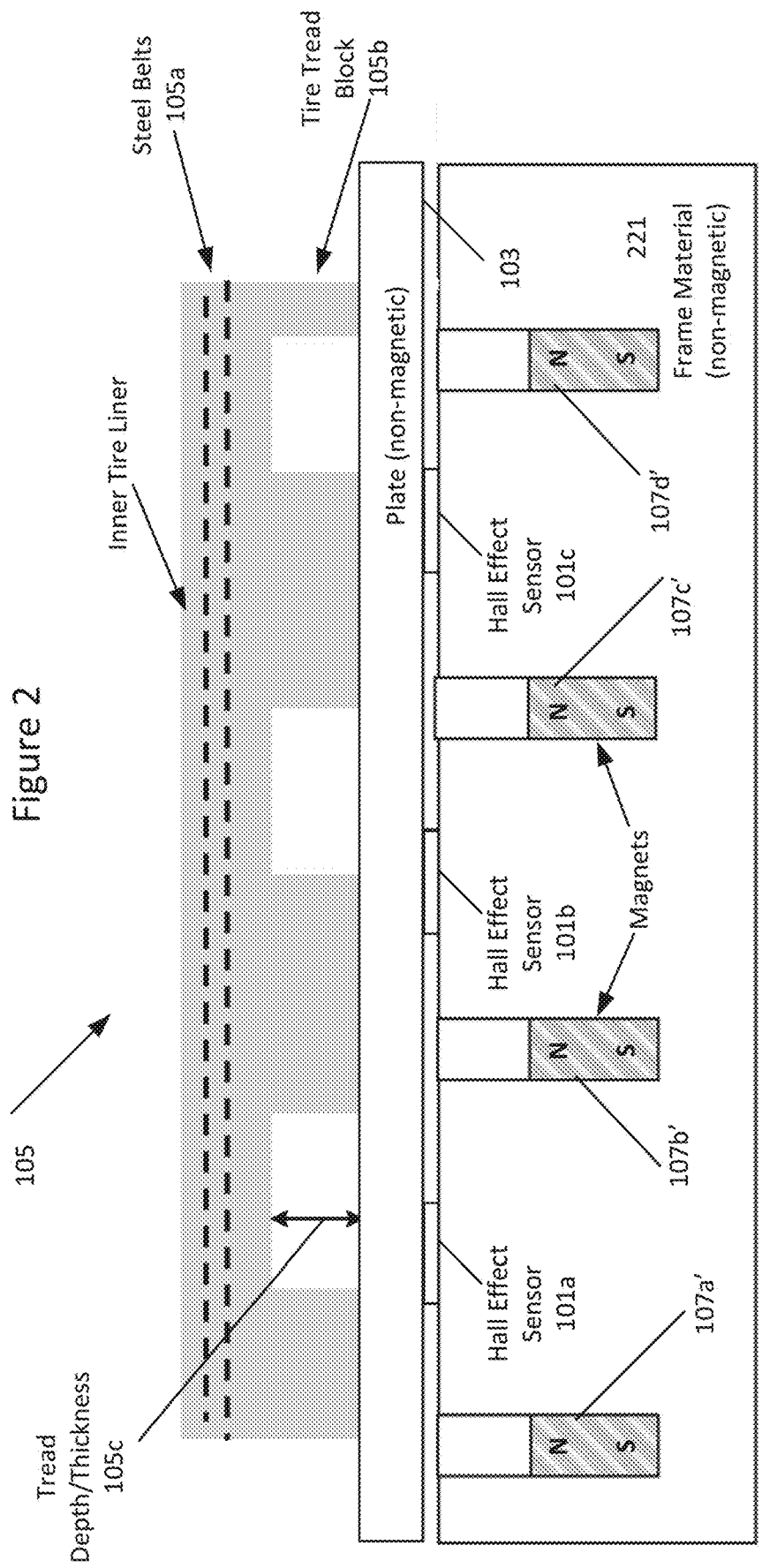
FIG. 2 is a cross sectional view illustrating a multi-sensor array system with magnets mounted vertically with each sensor positioned along a respective axis between two magnets according to some embodiments of inventive concepts.

Some embodiments of inventive concepts may provide a magnetic sensor that, when coupled with magnets (e.g., permanent magnets or electromagnets) aligned in a plane orthogonal to the plane in which the sensor resides, provides for measurement of the magnetic field associated with the steel belts in response to the magnets when the tire is directly adjacent to the array as shown in FIG. 1. Similarly, an array of sensors with a concomitant array of magnets can be employed to measure fields along the length of an array as shown in FIG. 2. A plate of non-magnetic material (e.g. aluminum, Delrin, etc.), also referred to as a non-magnetic layer 103 or non-magnetic plate, can be placed over the top of the array of sensors and magnets to protect them from the tire rolling over the array as shown in FIGS. 1 and 2. Poles of the magnets (e.g., permanent magnets and/or electromagnets) are each oriented vertically, either all north poles N face up and all south poles face down (as shown in FIGS. 1 and 2), or all south poles S face up and all north poles N face down.

Figure 5B:
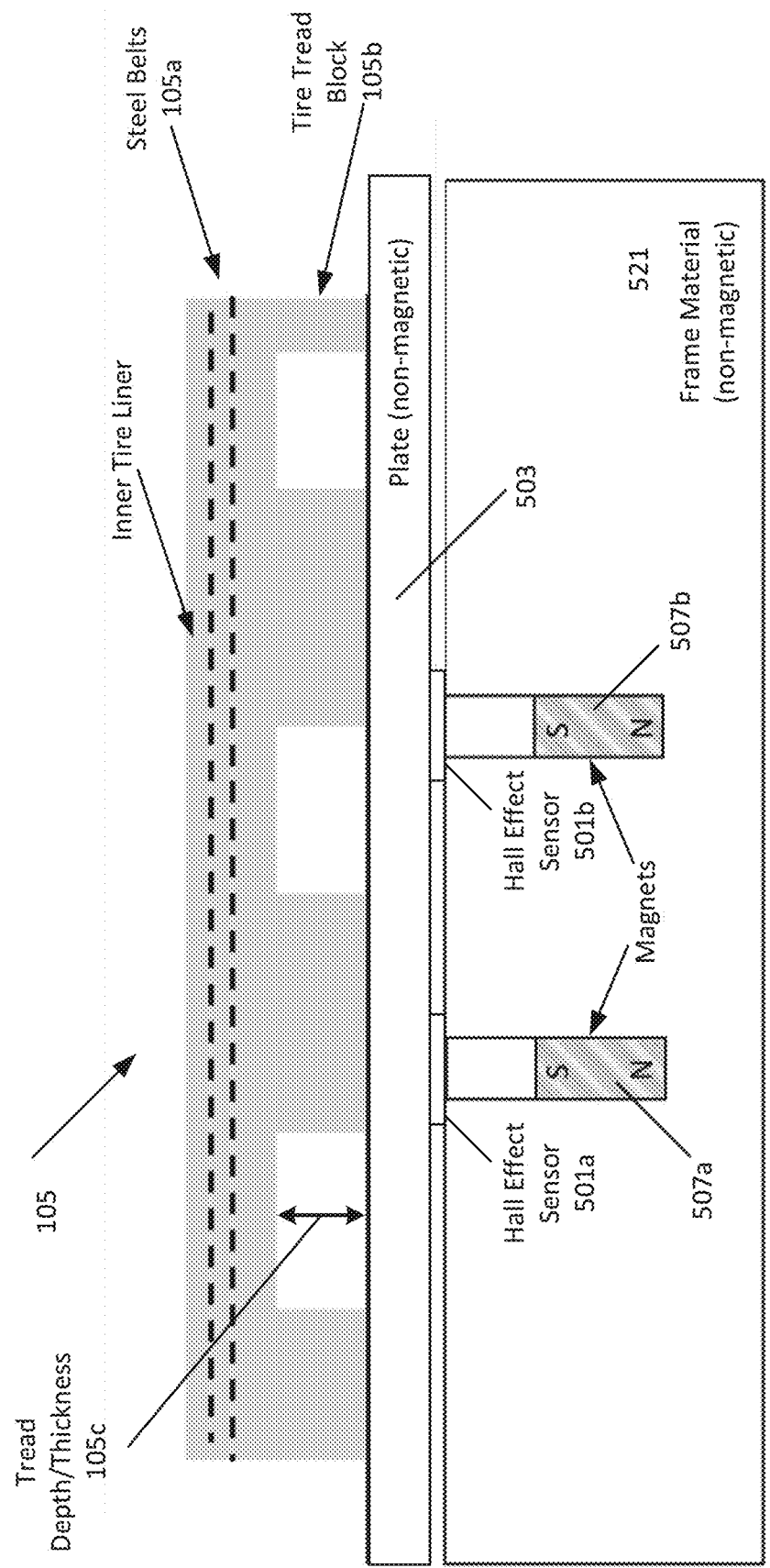
FIG. 5B is a cross sectional view illustrating a sensor system with magnets mounted vertically with each sensor positioned above a respective magnet according to some embodiments of inventive concepts.
Figure 5C:
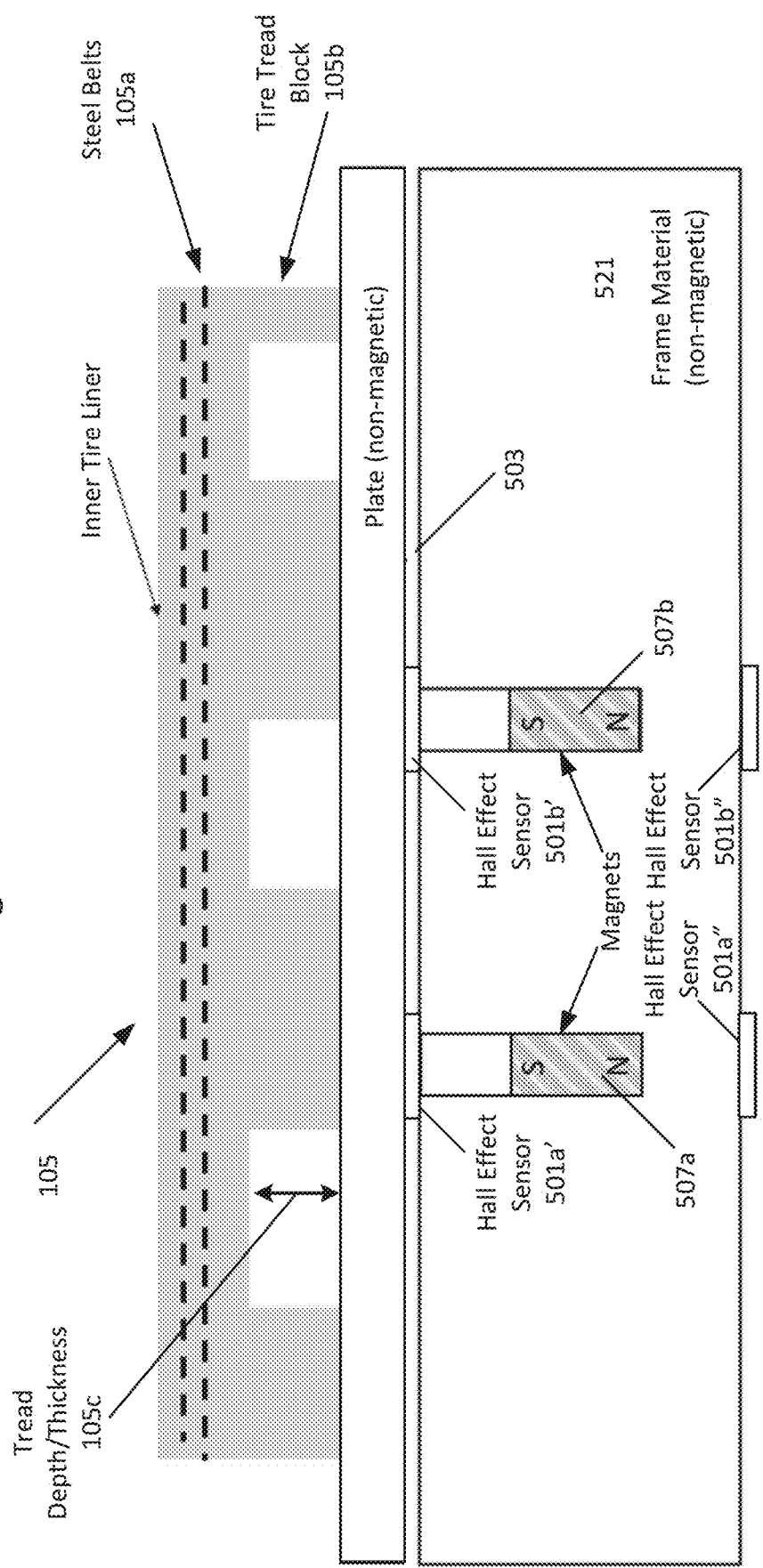
FIG. 5C is a cross sectional view illustrating a sensor system with magnets mounted vertically with sensors positioned above and below respective magnets according to some embodiments of inventive concepts.

The magnets can be arranged in a multitude of ways around the sensors including trigonal (not shown), square as shown in FIG. 3, pentagonal as shown in FIG. 4, or hexagonal as shown in FIG. 5A, or other arrangements. In addition, the magnets can be positioned such that a magnet is directly below (in the same vertical axis as) the sensor as shown in FIGS. 5B and 5C.

FIG. 1 illustrates a single sensor system with magnets 107a and 107b (e.g., permanent magnets or electromagnets) mounted vertically and with the same polarity facing up. As shown in FIG. 1, all north poles N may face up toward the non-magnetic plate 103, but according to other embodiments, all south poles S may face up toward the non-magnetic plate 103. The tire 105 with steel belts 105a is positioned above the sensor 101 as the tire 105 rolls over the sensor with tread blocks 105b on the sensor 101. The non-magnetic plate 103 protects/separates the sensor 101 (and magnets 107a and 107b with frame 121) from the tire 105. While the cross sectional view of FIG. 1 shows two magnets 107a and 107b on opposite sides of a vertical axis 131 through the sensor 101, any number of magnets may be arranged around the vertical axis 131 through the sensor 101, as shown, for example, in FIGS. 3, 4, and 5A.

As shown in FIG. 1, the magnets 107a and 107b may be recessed in the nonmagnetic frame 121. While not shown, the Hall effect sensor 101 may also be recessed in the nonmagnetic frame 121. Moreover, top surfaces of the magnets 107a and 107b may be below the Hall effect sensor 101 as shown to increase sensitivity of the system. When the tire 105 is on the nonmagnetic plate 103 opposite the magnets 107a and 107b and the Hall effect sensor 101, the steel belts 105a of the tire interact with the magnetic field produced by the magnets 107a and 107b, and these interactions with the magnetic field detected by the Hall effect sensor 101 can be used to determine tread depth/thickness 105c.

FIG. 2 illustrates a multi-sensor array system with magnets 107a', 107b', 107c', and 107d' (e.g., permanent magnets and/or electromagnets) mounted in the nonmagnetic frame 221 so that the nonmagnetic plate 103 is between the magnets 107a', 107b', 107c', and 107d' and the tire 105. In FIG. 2, a plurality of Hall effect sensors 101a, 101b, and 101c are provided (on or recessed in the non-magnetic frame 221) to allow separate measurements of the tire tread depth/thickness 105c across a width of the tire 105. In FIG. 2, each Hall effect sensor may operate as discussed above with respect to the single Hall effect sensor of FIG. 1. While the cross-sectional view of FIG. 2 shows all of the magnets and sensors in a same vertical plane, the magnets may be arranged as illustrated, for example, in any of FIGS. 3, 4, and/or 5A. As discussed above with respect to FIG. 1, top surfaces of the magnets may be below the Hall effect sensors to increase sensitivity of the system.

FIGS. 3, 4, and 5A illustrate top down views of frame plates 221 containing magnets 107 (shown as circles) and Hall sensors 101 (shown as squares), with the magnets arranged in square (FIG. 3), pentagonal (FIG. 4), and hexagonal (FIG. 5A) configurations around respective sensors. These structures may be used with an array of sensors as shown in FIG. 2 where each Hall effect sensor measures a magnetic field generated by adjacent magnets. According to some other embodiments, structures of FIGS. 3, 4, and 5A may be used with a single Hall effect sensor as discussed above with respect to FIG. 1 (e.g., one Hall effect sensor and four magnets arranged in a square as shown in FIG. 3, one Hall effect sensor and five magnets arranged in a pentagon as shown in FIG. 4, or one Hall effect sensor and six magnets arranged in a hexagon as shown in FIG. 5A).

FIG. 3 illustrates a top down view of a linear sensor array (a linear array of Hall effect sensors 101, shown as squares) with magnets 107 (e.g., permanent magnets and/or electromagnets) mounted in square configurations around a vertical axis (perpendicular with respect to the plane of FIG. 3) through each of the sensors 101. FIG. 4 illustrates a top down view of linear sensor array (a linear array of Hall effect sensors 101, shown as squares) with magnets 107 (e.g., permanent magnets and/or electromagnets) mounted in pentagonal configurations around a vertical axis (perpendicular with respect to the plane of FIG. 4) through each of the sensors. FIG. 5A illustrates a top down view of linear sensor array (a linear array of Hall effect sensors 101, shown as squares) with magnets 107 (e.g., permanent magnets and/or electromagnets) mounted in hexagonal configurations around a vertical axis (perpendicular with respect to the plane of FIG. 5) through each of the sensors. In each of FIGS. 3, 4, and 5A, magnets may be mounted symmetrically around a vertical axis through a sensor of the array to provide a magnetic field that is significantly symmetrical around the vertical axis. According to some other embodiments, two magnets may be provided on opposite sides of the vertical axis through the Hall effect sensor, three magnets may be provided defining an equilateral triangle around the vertical axis through the sensor, etc. According to still other embodiments, a cylindrical magnet may be provided around the vertical axis through the Hall effect sensor, or a single magnet may be provided below the Hall effect sensor as discussed below with respect to FIGS. 5B and 5C (so that the single magnet coincides with the vertical axis through the Hall effect sensor).

FIG. 5B illustrates a sensor system with magnets 507a and 507b (e.g., permanent magnets and/or electromagnets) mounted in frame 521 vertically and with the same polarity up, where each Hall effect sensor 501a and 501b is positioned directly above a respective magnet 507a and 507b. Stated in other words, each Hall effect sensor and the respective magnet are arranged along a same vertical axis so that a magnetic field of the magnet is symmetric about the vertical axis of the respective Hall effect sensor. While the south poles S are shown up in FIG. 5B, the opposite could be provided with all north poles N provided up. According to embodiments of FIG. 5B a single sensor and a single magnet may be provided to provide a measurement at one location of the tire, or a plurality of sensors/magnets may provide measurements at a respective plurality of locations across a width of the tire. Moreover, non-magnetic layer/ plate 503 may be provided between the sensors/frame and tire 105.

FIG. 5C illustrates a sensor system with magnets 507a and 507b (e.g., permanent magnets and/or electromagnets) mounted in frame 521 vertically and with the same polarity up, where a pair of Hall effect sensors are positioned directly above (sensors 501a' and 501b') and below (sensors 501a" and 501b") the respective magnet. The structure of FIG. 5C is the same as that of FIG. 5B with the additional of the lower Hall effect sensors 501a" and 501b". By providing a pair of Hall effect sensors with one above the magnet(s) and one below, a differential measurement may be used to determine a tread depth/thickness 105c. While the south poles S are shown up in FIG. 5C, the opposite could be provided with all north poles N provided up. According to embodiments of FIG. 5C, a single sensor pair and a single magnet may provide a measurement at one location of the tire, or a plurality of sensor pairs/magnets may provide measurements at a respective plurality of locations across a width of the tire. The use of a sensor pair to provide differential measurement at one location of a tire may also be applied to embodiments of FIGS. 1, 2, 3, 4, and 5A by providing a second Hall effect sensor below the magnet(s) for each Hall effect sensor above the magnet(s). In FIG. 1, for example, a second Hall effect sensor may be provided on a lower surface of the non-magnetic frame 121 in vertical alignment with the Hall effect sensor 101 on the upper surface of the non-magnetic frame 121.

FIG. 6 is a cross sectional view illustrating parameters/ dimensions/geometries that may be used to specify system design. These parameters/dimensions/geometries are defined below.

| Parameter | Description |
| --- | --- |
| $d_{bt}$ | Distance from steel belts 105a to top of groove |
| $d_{bg}$ | Distance from steel belts 105a to tire groove base |
| $d_p$ | Plate thickness (vertical distance) |
| $Z_{ms}$ | Magnet to sensor vertical distance |
| $P_{mm}$ | Magnet to magnet pitch |
| $D_{mag}$ | Magnet diameter |
| $H_{mag}$ | Magnet height |

Figure 7:
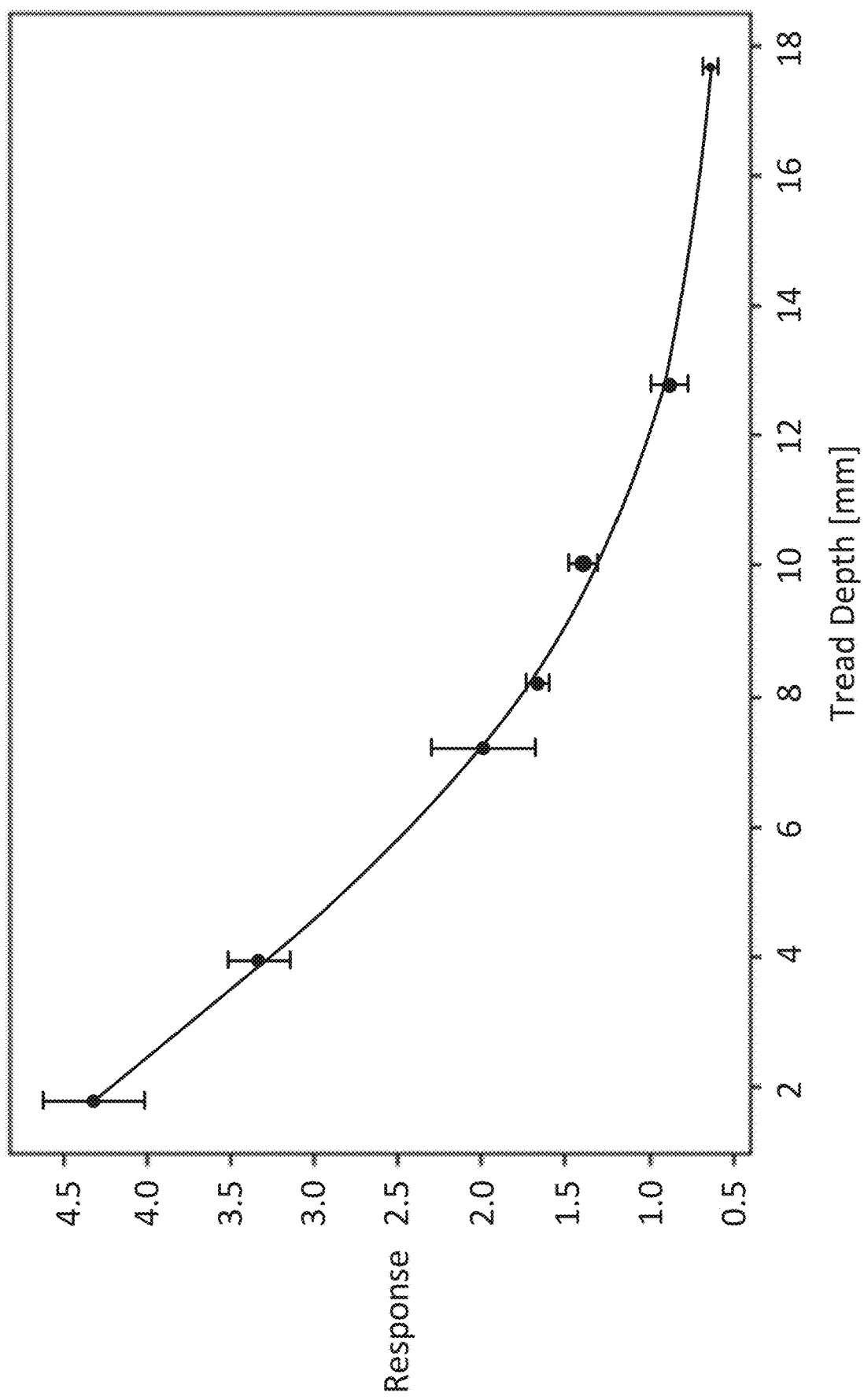
FIG. 7 is a graph illustrating response as a function of tread depth for a sensor system according to some embodiments of inventive concepts.

FIG. 7 is a graph illustrating sensor response to different tire tread thicknesses measured using configurations described herein. The Drive Over System DOS was used to measure each tread depth three times and the respective averages with corresponding one standard deviation error bars are plotted in FIG. 7. FIG. 7 illustrates data from measurements obtained from the different tire tread thicknesses.

A displacement between the top plane of the magnets and the sensor, defined as $Z_{ms}$ (as shown in FIG. 6) may provide enhancement in the sensor response by positioning the sensor in a zone of the magnetic field that is highly sensitive to changes in the magnetic field due to the presence and proximity of the tire steel belts when a tire is positioned over the sensor. In addition, the aspect ratio of the magnet ($H_{mag}/D_{mag}$) in combination with the magnet pitch $P_{mm}$, may be scalable. In other words, as long as the ratios of these parameters are maintained constant, their response may be consistent and can be scaled.

Figure 8:
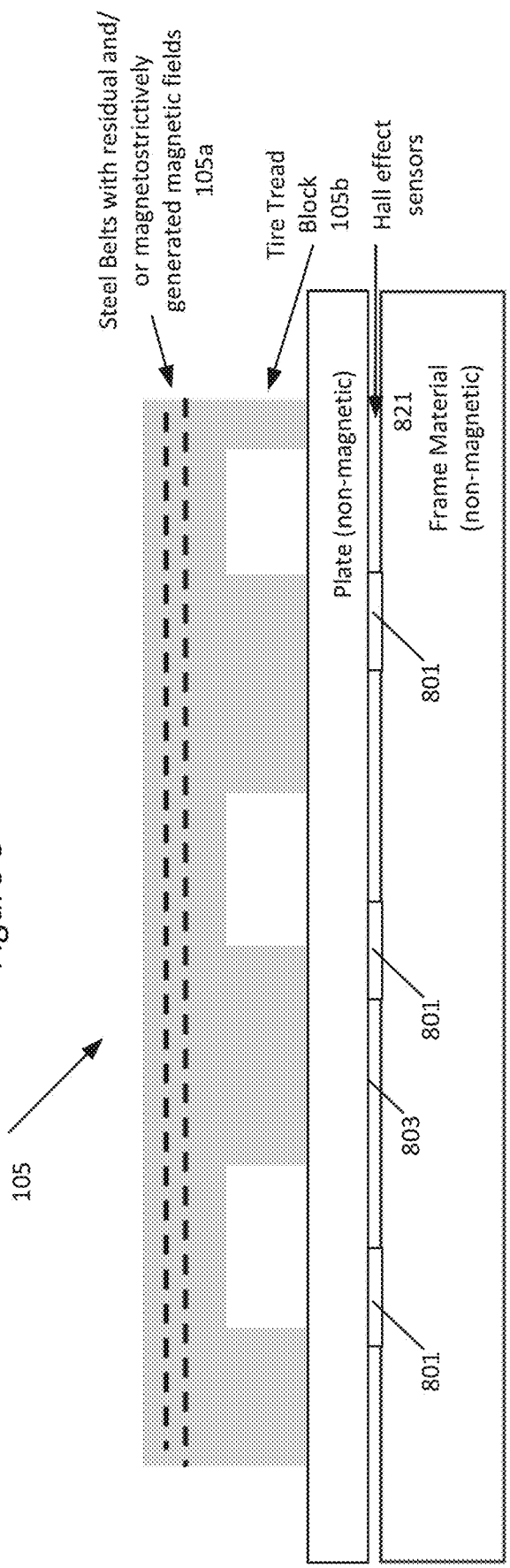
FIG. 8 is a cross sectional view illustrating a sensor system used to determine tread depth based on residual and/or magnetostrictively generated magnetic fields in steel belts of a tire according to some embodiments of inventive concepts.

An array of magnetic sensors 801 without magnets is illustrated in FIG. 8. The magnetic field measured by the sensors may result from residual magnetization and/or shape anisotropy of/in the steel belts 105a. No external magnets are required to induce a magnetic field.

The magnetic field strength measured using the array of sensors with no magnets shown in FIG. 8 can be assumed to be the maximum value produced by steel belts 105a. Sensors 801 may be provided in/on non-magnetic frame 821, and non-magnetic plate/layer 803 may be provided to protect sensors 801 from tire 105.

Figure 9:
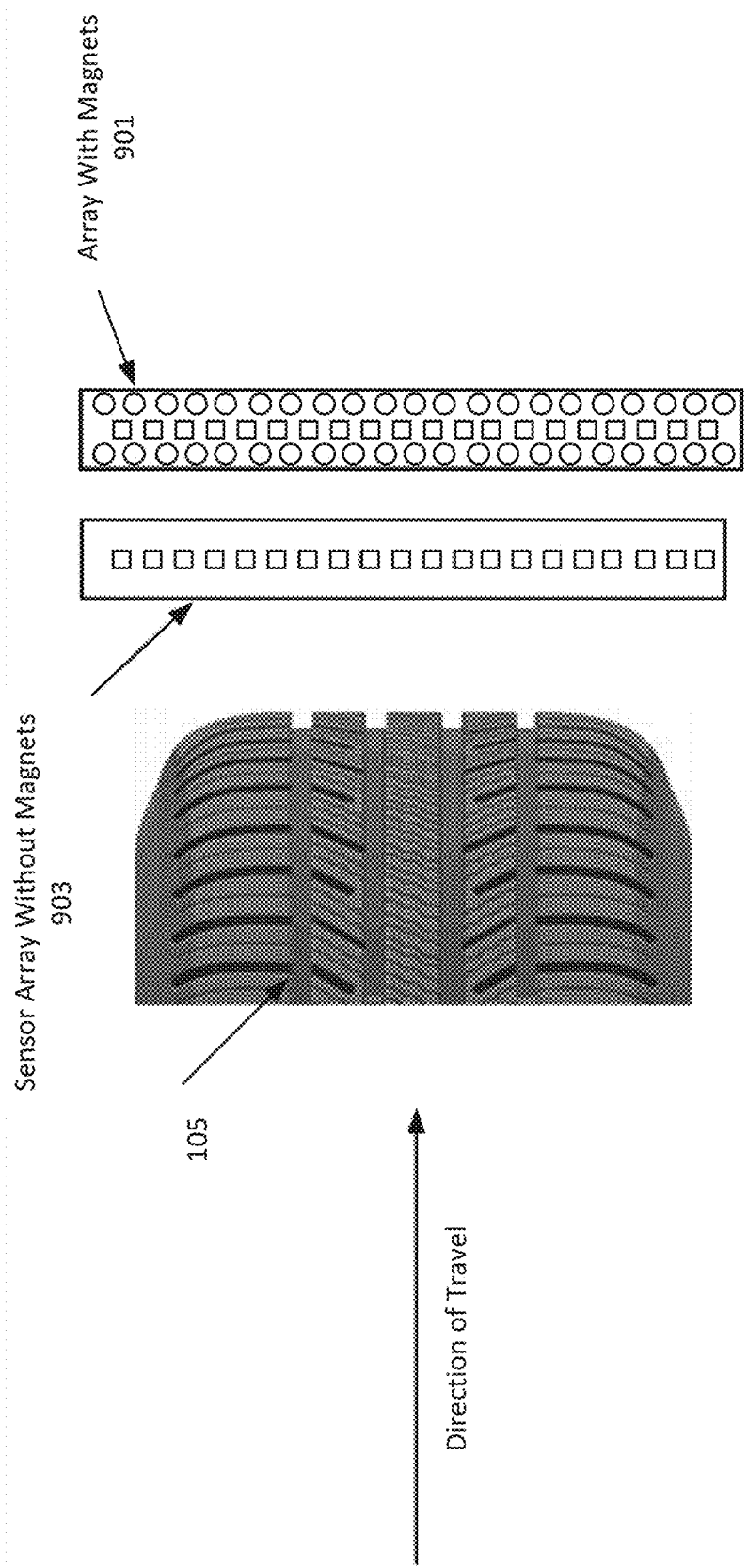
FIG. 9 is a diagram illustrating a system including two linear arrays of sensors (one array with magnets and one array without magnets) according to some embodiments of inventive concepts.

Multi-array systems are discussed below with respect to FIG. 9. As shown in FIG. 9, two linear arrays of Hall effect sensors may be provided, one array 903 without magnets and one array 901 with magnets. In arrays 901 and 903, the squares indicate magnetic sensors, and in array 901, the circles indicate magnets.

According to some embodiments of inventive concepts, the system may deploy two sensor arrays perpendicular to the direction of tire 105 rotation—one array 901 with magnets and the second array 903 without magnets as shown in FIG. 9. The sensor array 901 with magnets (indicated by circles) provides an overall response to both the residual magnetization in the steel belts of the tire (e.g., including residual magnetic fields, shape anisotropy, etc. in the steel belts of the tire) and the fields from the magnets. The sensor array 903 without the magnets picks up only the former (e.g., residual magnetic fields, shape anisotropy, etc. in the steel belts of the tires). The residual fields can then be mathematically extracted from the response measured using the sensors array with magnets. This approach may provide a method of fine-tuning the magnetic response and accounting for stray, residual fields. Stated in other words, the sensors of array 901 measure the disruption of the magnetic fields from the magnets of array 901 because of the steel belts of the tire being present. The closer the steel belts are, the more significant their impact on the magnetic field lines from the magnets and thus the change in signal measured by the sensors.

Figure 10:
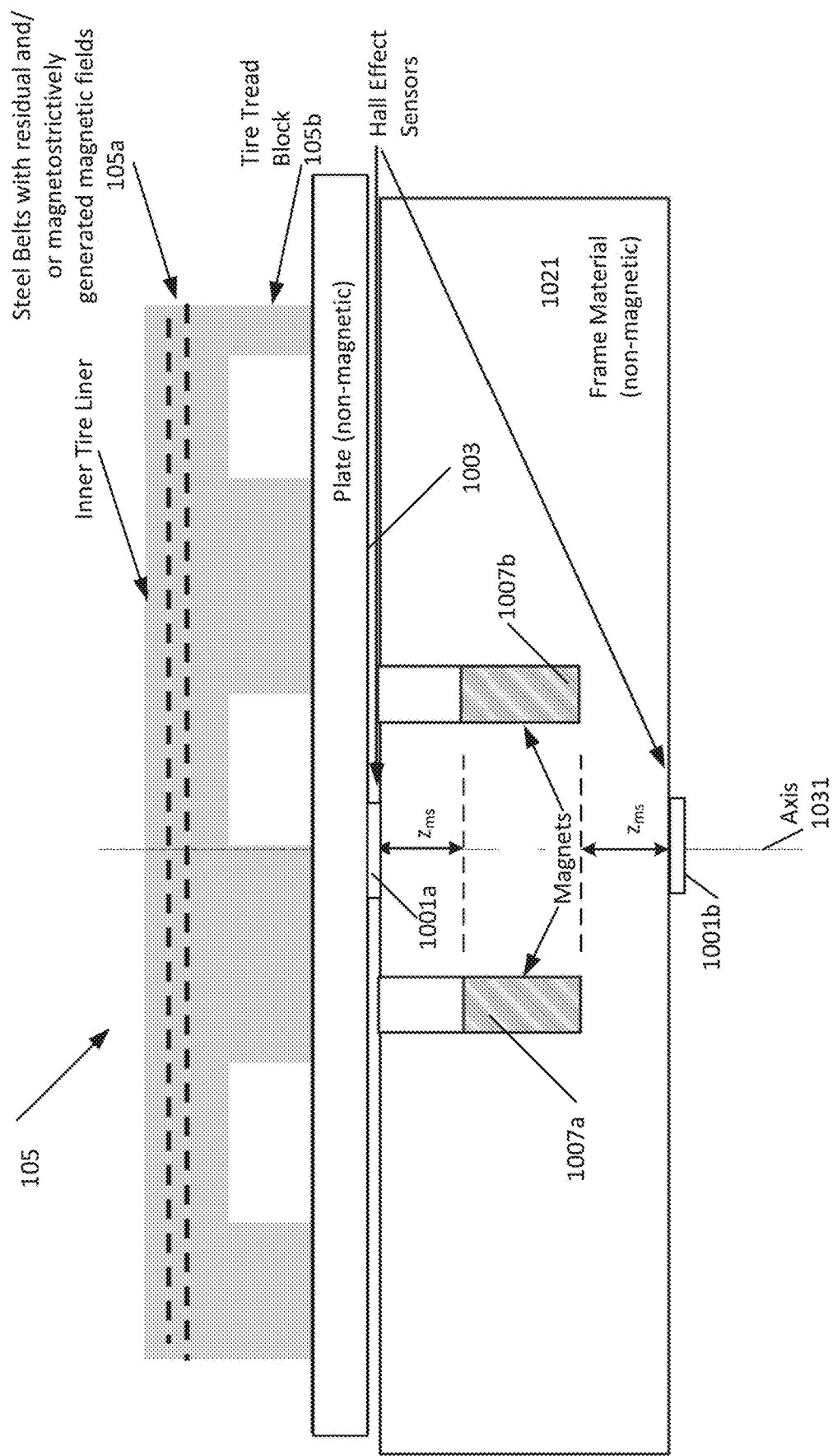
FIG. 10 is a cross sectional view illustrating a double sensor system with magnets mounted on opposite sides of a plane of the magnets according to some embodiments of inventive concepts.

According to some other embodiments of inventive concepts shown in FIG. 10, the system may deploy one double array of sensors perpendicular to the direction of tire rotation. In the double array of sensors, a second layer of Hall sensors is provided symmetrically opposed to the top sensors, at a vertical distance $Z_{ms}$ below the bottom face of the magnets. The second/lower row of Hall effect sensors picks up a base signal of the magnets and surroundings, that can be subtracted from the top array signal. The differential signal may respond primarily/exclusively to variations in distance of tire belt to the top sensor array, providing a highly sensible measure of the tread thickness.

FIG. 10 illustrates a double sensor system with magnets 1007a and 1007b (e.g., permanent magnets and/or electromagnets) mounted opposite the tire 105. In the system of FIG. 10, sensor 1001a is mounted in/on frame 1021 above a plane of magnets 1007a and 1007b, and sensor 1001b is mounted in/on frame 1021 below a plane of magnets 1007a and 1007b. In addition, non-magnetic layer/plate 1003 is provided to protect sensors 1001a/1001b, magnets 1007a/1007b, and/or frame 1021 from tire 105. Moreover, sensors 1001a and 1001b may be provide along an axis 1031 between the magnets 1007a and 1007b.

Figure 11:
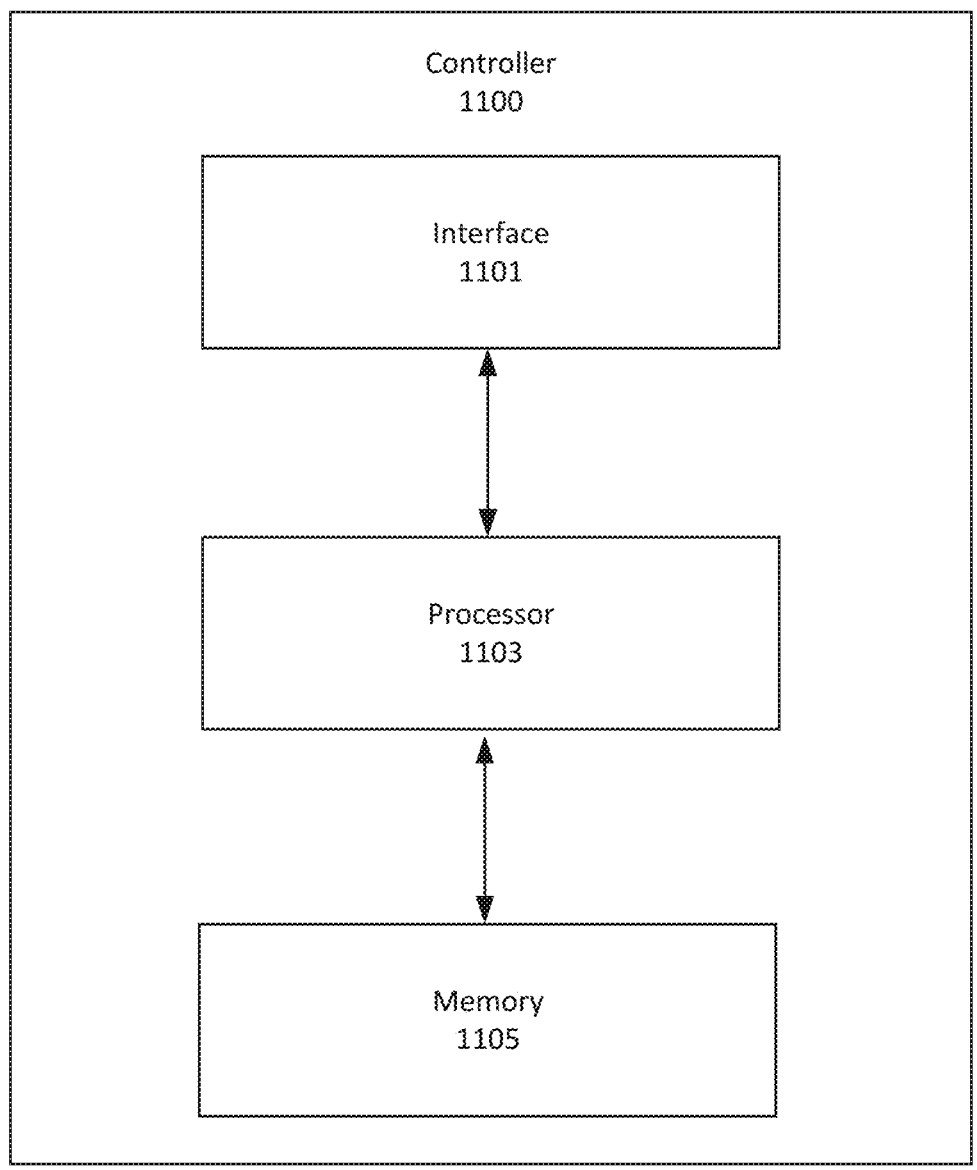
FIG. 11 is a block diagram illustrating elements of a sensor system according to some embodiments of inventive concepts.

FIG. 11 is a block diagram illustrating a controller 1100 that may be used with various sensor arrangements discussed above with respect to FIGS. 1-10 to provide tire tread depth/thickness 105c measurement according to some embodiments of inventive concepts. As shown, the controller 1100 may include a processor 1101 coupled with memory 1105 and interface 1101. Memory 1105 may include computer readable program code that when executed by processor 1103 causes processor 1103 to perform operations according to embodiments disclosed herein. Controller 1100 may also include interface 1101 coupled with processor 1103 to facilitate reception of information/signals from the magnetic sensor(s) and/or other sensors, to facilitate output of information (e.g., tire tread depths/thicknesses) from the processor 1103 (for example, to a display, printer, network, mobile device, etc.), and/or to accept user input (e.g., via a keypad, touch sensitive display, computer mouse, etc.). For example, the interface may provide a wired and/or wireless interface.

According to Embodiments of FIGS. 1 and 11, a system for measuring a tread depth/thickness 105c of a tire 105 may include nonmagnetic layer 103, magnets 107a and 107b (e.g., permanent magnets and/or electromagnets), magnetic sensor 101 (e.g., a Hall effect sensor) associated with magnets 107a and 107b, and controller 1100 of FIG. 11 coupled with magnetic sensors. Nonmagnetic layer 103 (shown as a non-magnetic plate) provides a drive over surface, wherein the drive over surface is adapted to receive tire 105 (including steel belts) thereon including the tread to be measured. Magnets 107a and 107b have opposing first and second magnetic poles, wherein the nonmagnetic 103 layer is between the drive over surface and the magnet, and wherein the magnet is arranged so that the first magnetic pole is between the second magnetic pole and the nonmagnetic layer. Nonmagnetic layer 103 is between the drive over surface and magnetic sensor 101, and magnetic sensor 101 is configured to detect a magnetic field resulting from magnets 107a and 107b and tire 105 (including steel belts 105a) on the drive over surface. Controller 1100 of FIG. 11 is configured to provide a depth/thickness measurement of the tread of the tire based on an output from the magnetic sensor 101 of FIG. 1. In particular, processor 1103 may be configured to receive information/signals (through interface 1101) from magnetic sensor 101, generate the measurement of the tread thickness/depth 105c based on the information/signals, and provide information regarding the tread depth/thickness through interface 1101, for example to a display, printer, network, mobile device, etc.

While shown in FIG. 1 with one sensor and associated magnets, embodiments of FIG. 1 may be implemented with a row of sensors (e.g., 101a, 101b, and 101c) and associated magnets (e.g., 107a', 107b', 107c', and 107d') and with controller 1100 receiving information/signals from each of the sensors to provide depth/thickness measurements at different locations across a width of a tire, as shown in FIG. 2.

In FIG. 1, a first distance between nonmagnetic layer 103 and the first magnetic poles (e.g., north poles N) of magnets 107a and 107b may be greater than a second distance between magnetic sensor 101 and nonmagnetic layer 103.

In FIG. 1, the first and second magnetic poles of each magnet have respective first and second polarities, magnets 107a and 107b are two of a plurality of magnets that are symmetrically arranged around an axis (shown as a dotted line) passing through magnetic sensor 101 and through nonmagnetic layer 103, and each of the plurality of magnets has a respective first pole of the first polarity (e.g., north pole N) between a respective second pole of the second polarity (e.g., south pole S) and nonmagnetic layer 103.

While FIG. 1 shows, two magnets 107a and 107b on opposite sides of the axis 131 through magnetic sensor 101 and nonmagnetic layer 103, any number of magnets may be symmetrically arranged around the axis 131 (shown as a dotted line) through magnetic sensor 101 and nonmagnetic layer 103 such that the plurality of magnets define vertices of a polygon having a center at the axis 131 (shown as a dotted line) through magnetic sensor 101 and nonmagnetic layer 103. For example, the plurality of magnets may comprise three magnets defining vertices of a triangle; the plurality of magnets may comprise four magnets defining vertices of a square; the plurality of magnets may comprise five magnets defining vertices of a pentagon, or the plurality of magnets may comprise six magnets defining vertices of a hexagon.

According to Embodiments of FIGS. 5B and 11, a system for measuring a tread of a tire may include nonmagnetic layer 503, magnets 507a and 507b (e.g., permanent magnets and/or electromagnets), magnetic sensors 501a and 501b (e.g., Hall effect sensors), and controller 1100. Nonmagnetic layer 503 provides a drive over surface, wherein the drive over surface is adapted to receive tire 105 (including steel belts 105a) thereon including the tread to be measured. Each of magnets 507a and 507b has opposing first and second magnetic poles, wherein nonmagnetic layer 503 is between the drive over surface and the magnets, and wherein each magnet is arranged so that the first magnetic pole is between the second magnetic pole and the nonmagnetic layer. Magnetic sensors 501a and 501b (e.g., Hall effect sensors) are associated with respective magnets, wherein nonmagnetic layer 503 is between the drive over surface and magnetic sensors 501a and 501b, wherein each of magnetic sensors 501a and 501b is configured to detect a magnetic field resulting from the respective magnet and tire 105 (including steel belts) on the drive over surface, and wherein each magnetic sensor is between the respective magnet and the nonmagnetic surface. Controller 1100 is coupled with magnetic sensors 501a and 501b, wherein the controller is configured to provide depth/thickness measurements 105c of the tread of the tire based on an output from magnetic sensors 501a and 501b. In particular, processor 1103 may be configured to receive information/signals from magnetic sensors 501a and 501b, generate the measurements of the tread thickness/depth based on the information/signals, and provide information regarding the tread depths/thicknesses through interface 1101, for example to a display, printer, network, mobile device, etc.

While shown in FIG. 5B with two magnetic sensors 501a and 501b and associated magnets 507a and 507b, embodiments of FIG. 5B may be implemented with a row of three or more sensors and associated magnets and with controller 1100 receiving information/signals from each of the sensors to provide depth/thickness measurements at three or more different locations across a width of a tire. According to other embodiments, a single sensor and associated magnet may be used to provide a single depth/thickness measurement.

According to Embodiments of FIGS. 5C and 11, a system for measuring a tread of a tire may include nonmagnetic layer 503, a first magnetic sensor pair (including magnetic sensors 501a' and 501a", e.g., Hall effect sensors), a second magnetic sensor pair (including magnetic sensors 501b' and 501b", e.g., Hall effect sensors), magnets 507a and 507b, and controller 1100.

Nonmagnetic layer 503 provides a drive over surface, wherein the drive over surface is adapted to receive tire 105 (including steel belts 105a) thereon including the tread to be measured. Each of magnets 507a and 507b has opposing first and second magnetic poles, wherein nonmagnetic layer 503 is between the drive over surface and the magnets, and wherein each magnet is arranged so that the first magnetic pole (e.g., the south pole S) is between the second magnetic pole (e.g., the north pole N) and nonmagnetic layer 503. Sensors of each magnetic sensor pair may be oriented on opposite sides of a respective magnet so that a first sensor of the pair is between the respective magnet and nonmagnetic surface 503 and so that the respective magnet is between the first and second sensors of the pair. Nonmagnetic layer 503 is thus between the drive over surface and the first magnetic sensor of the pair, and the first magnetic sensor of the pair is configured to detect a magnetic field resulting from the respective magnet and tire 105 (including steel belts) on the drive over surface. Moreover, the first magnetic sensor of the pair is between the second magnetic sensor of the pair and nonmagnetic layer 503, and the second magnetic sensor of the pair is configured to detect a magnetic field resulting from the respective magnet.

Controller 1100 is coupled with the first and second magnetic sensors of each pair, wherein the controller is configured to provide a depth/thickness measurement of the tread of the tire based on respective outputs from the first and second magnetic sensors of each pair. For example, processor 1103 may be configured to generate a first tread thickness/depth measurement based on information/signals (received through interface 1101) from magnetic sensors 501a' and 501a" (a first magnetic sensor pair) and a second tread thickness/depth measurement based on information/signals (received through interface 1101) from magnetic sensors 501b' and 501b" (a second magnetic sensor pair). In addition, processor 1103 may be configured to provide information regarding the tread depths/thicknesses through interface 1101, for example to a display, printer, network, mobile device, etc.

While shown in FIG. 5C with two sensor pairs 501a'/501a" and 501b'/501b" and associated magnets 507a and 507b, embodiments of FIG. 5C may be implemented with a row of three or more sensor pairs and associated magnets and with controller 1100 receiving information/signals from each of the sensor pairs to provide depth/thickness measurements at three or more different locations across a width of a tire. According to other embodiments, a single sensor pair and associated magnet may be used to provide a single depth/thickness measurement.

According to Embodiments of FIGS. 9 and 11, a system for measuring a tread of a tire may include a nonmagnetic layer, a first array 901 of magnetic sensors (e.g., Hall effect sensors) shown as squares with respective magnets shown as circles, a second array 903 of magnetic sensors (without magnets) shown as squares, and controller 1100. The nonmagnetic layer may provide a drive over surface as discussed above with respect to other embodiments, wherein the drive over surface is adapted to receive a tire (including steel belts) thereon including the tread to be measured. Each of the magnets has opposing first and second magnetic poles as discussed above with respect to other embodiments, wherein the nonmagnetic layer is between the drive over surface and the magnet, and wherein each magnet is arranged so that the first magnetic pole is between the second magnetic pole and the nonmagnetic layer. An array of such magnets is illustrated as open circles in FIG. 9.

First magnetic sensors (e.g., a first Hall effect sensor) of array 901 are associated with respective magnets, wherein the nonmagnetic layer is between the drive over surface and the first magnetic sensors, and wherein the first magnetic sensors are configured to detect magnetic fields resulting from the magnets and the tire (including steel belts) on the drive over surface. FIG. 9 shows an array 901 of such first magnetic sensors (filled squares) with associated magnets (open circles).

Second magnetic sensors (e.g., a second Hall effect sensors) of array 903 are spaced apart from the first magnetic sensors in a direction that is parallel with respect to the drive over surface, wherein the nonmagnetic layer is between the drive over surface and the second magnetic sensors, and wherein the second magnetic sensors are configured to detect a magnetic field resulting from the tire (including steel belts) on the drive over surface. FIG. 9 shows an array 903 of such second magnetic sensors (filled squares) without magnets to the left of the array 901 of first magnetic sensors. Accordingly, the magnetic sensors of the first and second arrays may be arranged so that the tire rolls over one array before the other.

With arrays of first magnetic sensors and second magnetic sensors, each first sensor may be associated with a respective one of the second sensors to define a pair. Accordingly, controller 1100 may be coupled with the first and second magnetic sensors of each pair, wherein the controller is configured to provide a depth/thickness measurement of the tread of the tire based on respective outputs from the first and second magnetic sensors of each pair. For example, processor 1103 may be configured to generate a first tread thickness/depth measurement based on information/signals (received through interface 1101) from magnetic sensors of a first pair and a second tread thickness/depth measurement based on information/signals (received through interface 1101) from magnetic sensors of a second pair. In addition, processor 1103 may be configured to provide information regarding the tread depths/thicknesses through interface 1101, for example to a display, printer, network, mobile device, etc.

According to Embodiments of FIGS. 10 and 11, a system for measuring a tread of a tire may include a nonmagnetic layer 1003, first and second magnetic sensors 1001a and 1001b (e.g., Hall effect sensors), magnets 1007a and 1007b (e.g., permanent magnets and/or electromagnets), and controller 1100. Nonmagnetic layer 1003 provides a drive over surface, wherein the drive over surface is adapted to receive the tire 105 (including steel belts) thereon including the tread to be measured. Each of magnets 1007a and 1007b has opposing first and second magnetic poles, wherein nonmagnetic layer 1003 is between the drive over surface and magnets 1007a and 1007b, and wherein each of magnets 1007a and 1007b are arranged so that the first magnetic pole is between the second magnetic pole and nonmagnetic layer 1003. First magnetic sensor 1001a is associated with magnets 1007a and 1007b, wherein nonmagnetic layer 1003 is between the drive over surface and first magnetic sensor 1001a, and wherein first magnetic sensor 1001a is configured to detect a magnetic field resulting from magnets 1007a and 1007b and the tire (including steel belts) on the drive over surface. Second magnetic sensor 1001b is associated with magnets 1007a and 1007b and with first magnetic sensor 1001a, wherein first magnetic sensor 1001a is between second magnetic sensor 1001b and nonmagnetic layer 1003, and wherein second magnetic sensor 1001b is configured to detect a magnetic field resulting from magnets 1007a and 1007b. Controller 1100 may be configured to provide a depth/thickness measurement of the tread of the tire based on respective outputs from first and second magnetic sensors 1001a and 1001b.

As shown, a first distance between first poles of magnets 1007a and 1007b and nonmagnetic layer 1003 may be greater than a second distance between first magnetic sensor 1001a and nonmagnetic layer 1003, and wherein a third distance between second poles of magnets 1007a and 1007b and nonmagnetic layer 1003 may be less than a fourth distance between second magnetic sensor 1001b and nonmagnetic layer 1003.

As shown, the first and second magnetic poles of magnets 1007a and 1007b may have respective first and second polarities, magnets 1007a and 1007b are two of a plurality of magnets that are symmetrically arranged around an axis (shown with dotted line) passing through first and second magnetic sensors 1001a and 1001b and through nonmagnetic layer 1003, and each of the plurality of magnets may have a respective first pole of the first polarity between a respective second pole of the second polarity and nonmagnetic layer 1003. As shown in FIG. 10, the plurality of magnets may include two magnets 1007a and 1007b on opposite sides of the axis through first and second magnetic sensors 1001a and 1001b and through nonmagnetic layer 1003. According to other embodiments, the plurality of magnets may define vertices of a polygon having a center at the axis through magnetic sensors 1001a and 1001b and nonmagnetic layer 1003. For example, the plurality of magnets may comprise three magnets defining vertices of a triangle; the plurality of magnets may comprise four magnets defining vertices of a square; the plurality of magnets may comprise five magnets defining vertices of a pentagon; or the plurality of magnets may comprise six magnets defining vertices of a hexagon.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

The dimensions of elements in the drawings may be exaggerated for the sake of clarity. Further, it will be understood that when an element is referred to as being "on" another element, the element may be directly on the other element, or there may be an intervening element therebetween. Moreover, terms such as "top," "bottom," "upper," "lower," "above," "below," and the like are used herein to describe the relative positions of elements or features as shown in the figures. For example, when an upper part of a drawing is referred to as a "top" and a lower part of a drawing is referred to as a "bottom" for the sake of convenience, in practice, the "top" may also be called a "bottom" and the "bottom" may also be a "top" without departing from the teachings of the inventive concept (e.g., if the structure is rotate 180 degrees relative to the orientation of the figure).

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor (also referred to as a controller) such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following claims and their equivalents, and shall not be restricted or limited by the foregoing detailed description.

The invention claimed is:

1. A system for measuring a tread of a tire, the system comprising:
    a nonmagnetic layer providing a drive over surface, wherein the drive over surface is adapted to receive the tire thereon including the tread to be measured;
    a magnet having opposing first and second magnetic poles, wherein the nonmagnetic layer is between the drive over surface and the magnet, and wherein the magnet is arranged so that the first magnetic pole is between the second magnetic pole and the nonmagnetic layer; and
    a magnetic sensor associated with the magnet, wherein the nonmagnetic layer is between the drive over surface and the magnetic sensor, and wherein the magnetic sensor is configured to detect a magnetic field resulting from the magnet and the tire on the drive over surface.

2. The system of claim 1, wherein a first distance between the first magnetic pole of the magnet and the nonmagnetic layer is greater than a second distance between the magnetic sensor and the nonmagnetic layer.

3. The system of claim 2, wherein the magnetic sensor is between the magnet and the nonmagnetic layer.

4. The system of claim 1, wherein the first and second magnetic poles have respective first and second polarities,
    wherein the magnet is one of a plurality of magnets that are symmetrically arranged around an axis passing through the magnetic sensor and through the nonmagnetic layer, and
    wherein each of the plurality of magnets has a respective first pole of the first polarity between a respective second pole of the second polarity and the nonmagnetic layer.

5. The system of claim 4, wherein the plurality of magnets comprise at least one of:
    magnets that define vertices of a polygon having a center at the axis through the magnetic sensor and the nonmagnetic layer;
    two magnets on opposite sides of the axis through the magnetic sensor and the nonmagnetic layer;
    three magnets defining vertices of a triangle;
    four magnets defining vertices of a square;
    five magnets defining vertices of a pentagon; and
    six magnets defining vertices of a hexagon.

6. The system of claim 1, further comprising:
    a controller coupled with the magnetic sensor,
    wherein the controller is configured to provide a measurement of the tread of the tire based on an output from the magnetic sensor.

7. The system of claim 1, wherein the magnetic sensor is a first magnetic sensor,
    the system further comprising:
    a second magnetic sensor associated with the magnet and with the first magnetic sensor,
    wherein the first magnetic sensor is between the second magnetic sensor and the nonmagnetic layer, and
    wherein the second magnetic sensor is configured to detect a magnetic field resulting from the magnet.

8. The system of claim 7, wherein a first distance between the first pole of the magnet and the nonmagnetic layer is greater than a second distance between the first magnetic sensor and the nonmagnetic layer, and
    wherein a third distance between the second pole of the magnet and the nonmagnetic layer is less than a fourth distance between the second magnetic sensor and the nonmagnetic layer.

9. The system of claim 8, wherein the first magnetic sensor is between the magnet and the nonmagnetic layer, and
    wherein the magnet is between the first and second magnetic sensors.

10. The system of claim 7, wherein the first and second magnetic poles have respective first and second polarities,
    wherein the magnet is one of a plurality of magnets that are symmetrically arranged around an axis passing through the first and second magnetic sensors and through the nonmagnetic layer, and
    wherein each of the plurality of magnets has a respective first pole of the first polarity between a respective second pole of the second polarity and the nonmagnetic layer.

11. The system of claim 10, wherein the plurality of magnets comprise at least one of:
- magnets that define vertices of a polygon having a center at the axis through the magnetic sensor and the nonmagnetic layer;
- two magnets on opposite sides of the axis through the first and second magnetic sensors and through the nonmagnetic layer;
- three magnets defining vertices of a triangle;
- four magnets defining vertices of a square;
- five magnets defining vertices of a pentagon; and
- six magnets defining vertices of a hexagon.

12. The system of claim 7, further comprising:
- a controller coupled with the first and second magnetic sensors,
- wherein the controller is configured to provide a measurement of the tread of the tire based on respective outputs from the first and second magnetic sensors.

13. The system of claim 1, wherein the magnetic sensor is a first magnetic sensor,
the system further comprising:
- a second magnetic sensor spaced apart from the first magnetic sensor in a direction that is parallel with respect to the drive over surface,
- wherein the nonmagnetic layer is between the drive over surface and the second magnetic sensor, and
- wherein the second magnetic sensor is configured to detect a magnetic field resulting from the tire on the drive over surface.

14. The system of claim 13, further comprising:
- a controller coupled with the first and second magnetic sensors,
- wherein the controller is configured to provide a measurement of the tread of the tire based on respective outputs from the first and second magnetic sensors.

15. The system of claim 1, wherein the magnet is a first magnet, and
wherein the magnetic sensor is a first magnetic sensor, the system further comprising:
- a second magnet, wherein the nonmagnetic layer is between the drive over surface and the magnet; and
- a second magnetic sensor associated with the second magnet,
- wherein the nonmagnetic layer is between the drive over surface and the second magnetic sensor, and
- wherein the magnetic sensor is configured to detect a magnetic field resulting from the second magnet and the tire on the drive over surface.

16. The system of claim 15, wherein the first and second magnetic sensors are spaced apart in a direction parallel with respect to the drive over surface.

17. The system of claim 15, are configured so that different portions of the tire across a width of the tire are aligned with the first and second magnetic sensors when the tire is on the drive over surface.

18. The system of claim 15, further comprising:
- a controller coupled with the first and second magnetic sensors, wherein the controller is configured to provide a first measurement of a first portion of the tread of the tire based on an output from the first magnetic sensor and to provide a second measurement of a second portion of the tread of the tire based on an output from the second magnetic sensor.

19. The system of claim 1, wherein the magnetic sensor comprises a Hall effect sensor, and
wherein the magnet comprises at least one of a permanent magnet and/or an electro-magnet.

20. A method of operating a system for measuring a tread of a tire, the method comprising:
- generating a first magnetic field by a magnet while a tire is contacting a drive over surface provided by a nonmagnetic layer, the nonmagnetic layer being between the drive over surface and the magnet, the magnet having opposing first and second magnetic poles and being arranged so that the first magnetic pole is between the second magnetic pole and the nonmagnetic layer, and
- measuring a second magnetic field by a magnetic sensor, the second magnetic field resulting from an interaction between the tire and the first magnetic field, and the nonmagnetic layer being between the drive over surface and the magnetic sensor; and
- determining a depth of the tread of the tire based on the first magnetic field and the second magnetic field.

* * * * *